United States Patent [19]

Markovs et al.

[11] Patent Number: 4,529,746
[45] Date of Patent: Jul. 16, 1985

[54] ALKYLATED VICINAL TOLUENEDIAMINES AND THEIR USE AS CHAIN EXTENDERS IN THE PREPARATION OF POLYURETHANE-POLYUREA ELASTOMERS

[75] Inventors: Robert A. Markovs, Grosse Ile; John W. Lightsey, Wyandotte; Gerhard G. Ramlow, Grosse Ile; Peter T. Kan, Plymouth, all of Mich.

[73] Assignee: BASF Wyandotte Corporation, Wyandotte, Mich.

[21] Appl. No.: 569,825

[22] Filed: Jan. 11, 1984

Related U.S. Application Data

[62] Division of Ser. No. 430,176, Sep. 30, 1982, abandoned.

[51] Int. Cl.³ .................................................. C08G 18/14
[52] U.S. Cl. ...................... 521/159; 264/51; 264/328.1; 264/328.6; 264/328.8; 521/160; 521/163; 528/64; 528/67; 528/76; 528/83
[58] Field of Search ................ 264/51, 328.1, 328.6, 264/328.8; 521/159, 160, 163; 528/64, 67, 76, 83

[56] References Cited

U.S. PATENT DOCUMENTS 4,218,543 8/1980 Weber et al. ...................... 521/117

Primary Examiner—Maurice J. Welsh
Attorney, Agent, or Firm—Norbert M. Lisicki; David L. Hedden

[57] ABSTRACT

This invention relates to alkylated vicinal toluenediamines and their use as chain extenders in the preparation of polyurethane elastomers.

9 Claims, No Drawings

4,529,746

ALKYLATED VICINAL TOLUENEDIAMINES AND THEIR USE AS CHAIN EXTENDERS IN THE PREPARATION OF POLYURETHANE-POLYUREA ELASTOMERS

This is a division, of application Ser. No. 430,176, filed Sept. 30, 1982 and now abandoned.

BACKGROUND OF THE INVENTION

1. Field of the Invention

This invention relates to alkylated vicinal toluenediamines and their use as chain extenders in the preparation of polyurethane-polyurea elastomers.

2. Description of the Prior Art

U.S. Pat. No. 3,275,690 describes the preparation of alkylated 2,4-diaminotoluene and 2,6-diaminotoluene. However, none of the examples in the patent relates to the alkylation of vicinal toluenediamine, nor does this patent suggest the use of such compounds as chain extenders in the preparation of polyurethane elastomers.

U.S. Pat. No. 4,218,543 relates to a process for preparing polyurethane elastomers by reaction injection molding. Certain alkylated aromatic diamines including alkylated 2,4- and 2,6-diaminotoluene are used as chain extenders in the process. However, the use of alkylated vicinal toluenediamines as chain extenders is not taught or suggested.

SUMMARY OF THE INVENTION

The subject invention relates to a mixture of alkylated vicinal toluenediamines comprising compounds having the following structural formulae:

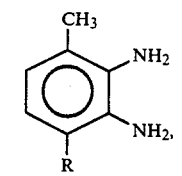

(a)

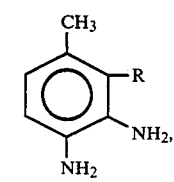

(b)

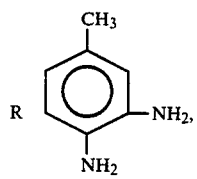

and

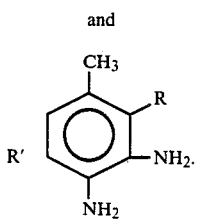

(c)

(d)

wherein R and R' independently represent a linear or nonlinear alkyl radical having 1 to 4 carbon atoms. Preferably, R and R' represent a methyl, ethyl, n-propyl, i-propyl, n-butyl, i-butyl, s-butyl, or t-butyl radical. Hereinafter a mixture of such compounds will be referred to as a mixture of alkylated vicinal toluenediamines.

The invention also relates to a process for preparing polyurethane-polyurea elastomers by using the mixture of alkylated vicinal toluenediamines as chain extenders in the process.

The polyurethane-polyurea elastomers have unexpected and improved properties when compared to polyurethane-polyurea elastomers which are prepared by using diethyl 2,4- and 2,6-diaminotoluene as the chain extender. In particular their elongation values indicate that they can be stretched more than six times their length without breaking. This property makes the polyurethane-polyurea elastomers particularly useful for applications requiring a high degree of flexing and distortion. Such an elastomer may be particularly useful in shoe sole applications.

Likewise, the impact strength of such elastomers having high elongations is typically superior to those with lower elongations. For use in exterior automotive applications where impact strength is a vital property, a high elongation value is of extreme importance. The low temperature ($-20°$ F. to $-50°$ F.) performance of such elastomers will also be superior due to their greater flexibility under such conditions. The addition of inorganic fillers such as milled glass, chopped glass, flaked glass, mica, wollastonite and others, which are added for reinforcement purposes, invariably lowers elongations to very low values (approximately 25 percent), which, in turn, has a negative effect on impact properties. Therefore, the greater elongation of elastomers based upon vicinal toluenediamine would be expected to provide substantial improvement in the impact properties of reinforced reaction injection molded parts.

Additionally, these elastomers demonstrate a split tear value double that of diethyl toluenediamine based elastomers. This provides a greater strength against tearing to the elastomer. If a tear is initiated in the alkylated vicinal toluenediamine based elastomer, it will not propagate nearly as far as a tear initiated in a diethyl toluenediamine based elastomer. Therefore, the elastomer will last longer.

DESCRIPTION OF THE PREFERRED EMBODIMENTS

In order to prepare the polyurethane-polyurea elastomers of the subject invention, an organic polyisocyanate is reacted with a compound having an average molecular weight of 1000 to 8000 containing two or more active hydrogen atoms, as determined by the Zerewitinoff method, and a mixture of alkylated vicinal toluenediamines. Catalysts, blowing agents, fillers, surfactants, and various other ingredients may also be incorporated into the reaction mixture. The molded polyurethane-polyurea elastomers are preferably prepared by the use of reaction injection molding.

In preparing the polyurethane-polyurea elastomers of the subject invention, any conventional organic polyisocyanate, modified organic polyisocyanate, or quasi prepolymer can be used, as well as mixtures. Representative conventional organic polyisocyanates correspond to the following formula:

wherein R″ is a polyvalent organic radical which is either aliphatic, aralkyl, alkaryl, aromatic or mixtures thereof, and z is an integer which corresponds to the valence of R″ and is at least two. Representative of the organic polyisocyanates contemplated herein include, for example, aromatic diisocyanates such as 2,4-toluene diisocyanate, 2,6-toluene diisocyanate, mixtures of 2,4- and 2,6-toluene diisocyanate, crude toluene diisocyanate, 4,4′-diphenylmethane diisocyanate, 2,4′-diphenylmethane diisocyanate, mixtures of 4,4′- and 2,4′-diphenylmethane diisocyanate, polymethylene polyphenyl isocyanates, mixtures of diphenylmethane diisocyanates and polymethylene polyphenyl polyisocyanates, and the like; aromatic triisocyanates such as 4,4′,4″-tri-phenylmethane triisocyanate, 2,4,6-toluene triisocyanates; aromatic tetraisocyanates such as 4,4′-dimethyldiphenylmethane-2,2′,5,5′-tetraisocyanate, and the like; arylalkyl polyisocyanates such as xylene diisocyanate; aliphatic polyisocyanates such as hexamethylene-1,6-diisocyanate, lysine diisocyanate methylester and the like, and mixtures thereof. Other organic polyisocyanates include hydrogenated methylene diphenylisocyanate, m-phenylene diisocyanate, naphthalene-1,5-diisocyanate, 1-methoxyphenylene-2,4-diisocyanate, 4,4′-biphenylene diisocyanate, 3,3′-dimethoxy-4,4′-biphenyl diisocyanate, 3,3′-dimethyl-4,4′-biphenyl diisocyanate, and 3,3′-dimethyldiphenylmethane-4,4′-diisocyanate. These polyisocyanates are prepared by conventional methods known in the art such as the phosgenation of the corresponding organic amine.

As was mentioned, isocyanates which are modifications of the above isocyanates which contain carbodiimide, allophanate or isocyanurate structures may also be used. Quasi-prepolymers may also be employed. These quasiprepolymers are prepared by reacting an excess of organic polyisocyanate or mixtures thereof with a minor amount of an active hydrogen-containing compound as determined by the well-known Zerewitinoff test, as described by Kohler in *Journal of the American Chemical Society*, Vol. 49, page 3181 (1927). These compounds and their methods of preparation are well known in the art. The use of any one specific active hydrogen compound is not critical hereto, rather any such compound can be employed herein. Generally, the quasiprepolymers have a free isocyanate content of from 20 percent to 40 percent by weight.

In order to prepare polyurethane-polyurea elastomers, the organic polyisocyanates are reacted with one or more compounds having an average molecular weight from 1000 to 8000 containing two or more active hydrogen atoms as determined by the Zerewitinoff method described previously. Preferably the active hydrogen containing compounds have an average molecular weight from 2000 to 7000. Examples of such compounds include, but are not limited to, hydroxyl-terminated polyesters; polyoxyalkylenepolyether polyols; graft polyoxyalkylenepolyether polyols; alkylene oxide adducts of organic compounds having at least two reactive hydrogen atoms such as amines and thiols; and hydroxy terminated acetals. These compounds will now be more specifically described.

Any suitable hydroxy-terminated polyester may be used such as are obtained, for example, from the reaction of polycarboxylic acids of polycarboxylic acid anhydrides and polyhydric alcohols. Any suitable polycarboxylic acid may be used in the preparation of hydroxy-terminated polyesters such as succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-butyl-α-ethyl-glutaric acid, α, β-diethylsuccinic acid, phthalic acid, isophthalic acid, terephthalic acid, hemimellitic acid, and 1,4-cyclohexanedicarboxylic acid. Anhydrides such as phthalic, tetrachlorophthalic, tetrabromophthalic, maleic, and 1,4,5,6,7,7-hexachlorobicyclo-(2,2,1)-5-heptane-2,3-dicarboxylic acid anhydride also may be used in the preparation of the hydroxy-terminated polyesters. Any suitable polyhydric alcohol, including both aliphatic and aromatic, may be reacted with the polycarboxylic acid or polycarboxylic acid anhydride to prepare the hydroxy-terminated polyesters. Representative examples include ethylene glycol, 1,3-propanediol, 1,2-propane glycol, 1,4-butanediol, 1,3-butanediol, 1,2-butane glycol, 1,5-pentanediol, 1,4-pentanediol, 1,3-pentanediol, 1,6-hexanediol, 1,7-heptanediol, 2-butene-1,4-diol glycerol, 1,1,1-trimethylolpropane, 1,1,1-trimethylolethane, hexane-1,2,6-triol, α-methyl glucoside, pentaerythritol, and sorbitol. Also included with the term "polyhydric alcohol" are compounds derived from phenolic compounds such as 2,2-bis(4-hydroxyphenyl)propane, commonly known as Bisphenol A and hydroxyalkyl ethers of such phenolic compounds such as bis-2-hydroxyethyl ether of hydroxyquinone, and the alkylene oxide adducts of the above-named polyhydric alcohols.

The hydroxy-terminated polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above, or they may be made using the same components that make up the hydroxy-terminated polyester with only a portion of the components being a diamine such as ethylenediamine. The hydroxy-terminated polyester may also be a hydroxy-terminated polycaprolactone polyol.

Polyoxyalkylene ether polyols are preferably used as the polyol. These compounds are prepared by reacting an alkylene oxide with a polyhydric alcohol. Any suitable polyhydric alcohol may be used in the preparation of the polyoxyalkylene polyether polyol, such as those disclosed above for use in the preparation of the hydroxy-terminated polyesters. Any suitable alkylene oxide may be reacted with the polyhydric alcohol to prepare the polyoxyalkylene polyol. Representative examples include ethylene oxide, propylene oxide, butylene oxide, amylene oxide, styrene oxide, or mixtures thereof. Polyoxyalkylene polyols derived from two or more oxides may possess either block or heteric structure. In addition to polyoxyalkylene polyols, other compounds such as polyols derived from tetrahydrofuran and alkylene oxide-tetrahydrofuran mixtures may be used. The polyoxyalkylene polyether polyols preferably have primary hydroxyl groups, but may have secondary hydroxyl groups, and preferably, are polyethers prepared from alkylene oxides having from two to six carbon atoms such as polyethylene ether glycols, polyoxypropylene ether glycols and polyoxybutylene ether glycols. The polyoxyalkylene polyether polyols may be prepared by any known process such as, for example, the process disclosed by Wurtz in 1859 and in *Encyclopedia of Chemical Technology*, Vol. 7, pp. 257-262, published by Interscience Publishers, Inc. (1951), or the process disclosed in U.S. Pat. No. 1,922,459. Alkylene oxide adducts of Mannich condensation products are also useful in the invention.

In addition to the polyoxyalkylene polyether polyols just described, graft polyoxyalkylene polyether polyols may also be used in the preparation of the reactive polyol composition. These polyols are prepared by the in situ polymerization of a vinyl monomer or monomers in a reactive polyol medium and in the presence of a free radical initiator. The reaction is generally carried out at a temperature ranging from about 40° C. to 150° C. A more comprehensive discussion of the graft polyols and their method of preparation can be found in U.S. Pat. Nos. 4,208,314, 3,383,351 (Re 28,715), 3,304,273, 3,652,639, and 3,823,201 (Re 29,014), the disclosures of which are hereby incorporated by reference.

As was previously mentioned, other suitable polyols, which can be used in the reactive polyol composition of this invention, include the alkylene oxide adducts of organic compounds having at least 2 active hydrogens, such as amines and thiols. The alkylene oxides which are useful in this regard are the same as those described in connection with the preparation of polyoxyalkylene polyether polyols.

Suitable thiols which may be reacted with an alkylene oxide include alkane thiols containing at least two -SH groups such as 1,2-ethanedithiol, 1,2-propanedithiol, 1,3-propanedithiol, and 1,6-hexanedithiol; and alkenethiols such as 2-butene-1,4-dithiol, and alkynethiols such as 3-hexyne-1,6-dithiol.

Suitable polyamines which can be reacted with an alkylene oxide include aromatic polyamines such as methylene dianiline, polyaryl-polyalkylene polyamine (crude methylene dianiline), p-aminoaniline, 1,5-diaminonaphthalene, and 2,4-diaminotoluene; aliphatic polyamines such as ethylenediamine, 1,3-propanediamine, 1,4-butanediamine, and 1,3-butanediamine, as well as substituted secondary derivatives thereof.

As was previously mentioned, hydroxy-terminated polyacetals may also be used as polyols in accordance with this invention. These may be prepared, for example, by the reaction of formaldehyde or other suitable aldehyde with a dihydric alcohol or an alkylene oxide such as those previously described.

The alkylated vicinal toluenediamines which are mixed with the polyols to react with the organic polyisocyanates have the following structural formulae:

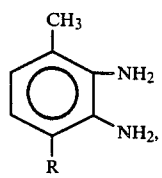 (a)

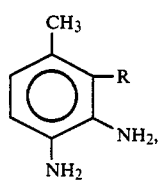 (b)

![structure c]

(c)

![structure d]

(d)

wherein R and R' independently represent a linear or nonlinear alkyl radical having 1 to 4 carbon atoms. Preferably, R and R' represent a methyl, ethyl, n-propyl, i-propyl, n-butyl, i-butyl, s-butyl, or t-butyl radical.

In order to prepare a mixture of alkylated vicinal toluenediamines, a mixture of 2,3- and 3,4-toluenediamine is alkylated with an aluminum chloride/aluminum anilide catalyst or diethyl aluminum chloride as the catalyst in excess aniline in accordance with U.S. Pat. No. 3,275,690. The mixture is heated to 300° C. to 400° C. at an alkylene pressure of 1200 psig to 1500 psig until alkylene absorption ceases. The mixture is then cooled, hydrolyzed with caustic, and distilled.

The process for preparing the mixture of alkylated vicinal toluenediamines differs from U.S. Pat. No. 3,275,690 in one important respect. It has been found that significantly higher catalyst levels are needed to alkylate vicinal toluenediamines than non vicinal toluenediamines. It has been found that in general at least 10 percent by weight, based upon the weight of the amine to be alkylated, of catalyst is needed for the alkylation process to produce even small yields. The mixture of alkylated vincinal toluenediamines is preferably used in amounts of 5 parts to 40 parts by weight based upon 100 parts by weight of the compound with an average molecular weight of 1000 to 8000 having two or more active hydrogens plus the weight of the mixture of alkylated vicinal toluenediamine.

In some cases, it may also be advantageous to replace partially the previously described alkylated vicinal toluenediamines by other chain extenders. The chain extenders advantageously have molecular weights of less than 400, preferably of 30 to 300, and preferably have 2 active hydrogen atoms. Examples of chain extenders include aliphatic and/or araliphatic diols having 2 to 14, preferably 2 to 6 carbon atoms such as ethylene glycol, 1,10-decanediol, diethylene glycol, dipropylene glycol and preferably 1,4-butanediol, 1,6-hexanediol and bis(2-hydroxyethyl)hydroquinone.

Secondary aromatic diamines can also be used as chain extenders. Examples include N,N'-dialkyl-substituted aromatic diamines wherein the n-alkyl radicals have 1 to 20, preferably 1 to 4, carbon atoms such as N,N'-diethyl-, N,N'-di-secondary butyl-, N,N'-dicyclohexyl-4,4'-diaminodiphenylmethane and N,N'-disecondary butylbenzidine. Other chain extenders include 3,3',5,5'-alkyl-substituted 4,4'-diaminodiphenylmethanes such as 3,3',5,5'-tetramethyl-, -tetraethyl-, and -tetra-n-propyl-, tetraisopropyl 4,4'-diaminodiphenylmethane.

In addition to the previously described ingredients, other ingredients such as surfactants, fillers, pigments, blowing agents, and catalysts can be included in the preparation of the polyurethane-polyurea elastomers. These ingredients are usually added to the polyol before reaction with the organic isocyanate to form a resin component which is then reacted with the isocyanate component.

Surfactants which can be used include polyoxyalkylene derivatives of siloxane or the alkylene oxide adducts of organic compounds containing reactive hydrogen atoms such as the ethylene oxide adducts of alcohols, glycols and phenols. Generally, the surfactants are employed in amounts ranging from about 0.01 part to 5 parts by weight per 100 parts of polyol.

Conventional fillers for use herein include, for example, aluminum silicate, calcium silicate, magnesium silicate, calcium carbonate, barium sulfate, calcium sulfate, glass fibers, flaked glass, carbon black, and silica. The filler, if used, is normally present in an amount ranging from about 5 parts to 50 parts by weight per 100 parts of resin.

A pigment which can be used herein can be any conventional pigment heretofor disclosed in the art such as titanium dioxide, zinc oxide, iron oxide, antimony oxide, chrome green, chrome yellow, iron blue siennas, molybdate oranges, and organic pigments such as para reds, benzidine yellow, toluidine red, toners, and phthalocyanines.

Conventional blowing agents such as halohydrocarbons, hydrocarbons and the like, can be employed herein in their conventional mode. Representative examples include halogenated hydrocarbons such as monochlorodifluoromethane, dichloromonofluoromethane, dichlorofluoromethane, and trichlorofluoromethane, and hydrocarbons such as propane and isobutane.

Any of the catalysts employed in the preparation of polyurethane foam can be employed in the subject invention. Representative of these catalysts include the tertiary amine catalysts such as diethylenetriamine, ketimine, tetramethylenediamine, triethylenediamine, tetramethylenediamine, tetramethylguanidine, trimethylpiperazine and the metalo-organic salt catalysts which are polyvalent metal salts of an organic acid having up to about 18 carbon atoms and being void of active hydrogen atoms. The organo portion of the salt may be either linear or cyclic or saturated or unsaturated. Generally, the polyvalent metal has a valence from about 2 to 4. Typical of these salts include: stannous acetate, stannous butyrate, stannous 2-ethylhexoate, stannous laurate, stannous oleate, stannous stearate, stannous octoate, lead cyclopentanecarboxylate, cadmium cyclohexanecarboxylate, lead naphthenate, lead octoate, cobalt naphthenate, zinc naphthenate, bis(phenylmercury)-dodecyl succinate, phenylmercuric benzoate, cadmium naphthenate, dibutyltin dilaurate and dibutyltin-di-2-ethylhexoate. Generally these catalysts will be employed in amounts ranging from about 0.01 part to 7.5 parts by weight based on the weight of the compound having an average molecular weight of 1000 to 8000 containing two or more active hydrogen atoms.

In general, the polyurethane-polyurea elastomers of the present invention are prepared by mixing together the ingredients mechanically and/or by the use of high pressure machinery. The ratio of ingredients is such that from 0.7 equivalent to 1.4 equivalents of isocyanate is present per equivalent of active hydrogen contained in the active hydrogen containing compound having a molecular weight of 1000 to 8000 and the chain extender. Preferably from 0.9 equivalent to 1.15 equivalents of isocyanate is present per equivalent of active hydrogen atom. As was previously mentioned, the polyol compositions described herein for the preparation of polyurethane-polyurea elastomers are particularly useful for the preparation of molded products by reaction injection molding techniques.

The Examples which follow will illustrate in more detail the practice of this invention. They are not intended to limit the scope of its application. The parts referred to in the Examples are by weight unless otherwise specified, and the temperatures are in degrees centigrade unless otherwise specified.

The following abbreviations will be used in the Examples:

EVTDA—a mixture of ethylated vicinal toluenediamines comprising approximately 22 weight percent of a compound represented by formula (a), 5 weight percent of a compound represented by formula (b), 32 weight percent of a compound represented by formula (c), and 41 weight percent of a compound represented by formula (d). (These formulae can be found under the Summary of Invention.)

ISOCYANATE—a quasi-prepolymer having a free isocyanate content of approximately 23 percent prepared by reacting 4,4-diphenylmethane diisocyanate with polypropylene glycols.

Polyol A—a polyol prepared by the reaction of ethylene oxide with the propylene oxide adduct of trimethyolpropane, said polyol having an average hydroxyl number of 25 and an ethylene oxide content of 15 percent by weight.

T-12—dibutytin dilaurate, a catalyst.

VTDA—a mixture of 2,3- and 3,4-toluenediamine isomers such that approximately 65 percent of the mixture is 3,4-toluenediamine.

EXAMPLES

Examples 1–5 will illustrate the preparation of a mixture of EVTDA.

EXAMPLE 1

A flask equipped with a stirrer, large capacity condenser, and nitrogen purge was charged with 1,900 parts of distilled aniline, 47 parts of aluminum powder, and 1 to 1.5 parts of anhydrous mercuric chloride. This slurry was heated to about 175° C.; a darkening of the slurry color and an increase of gas flow indicated that the reaction had begun. The accelerating reaction rate was controlled with cooling until rapid hydrogen evolution ceased; then heat was applied to reflux the aniline and finish the reaction. On cooling the mixture to 100° C. to 110° C., 74 parts of anhydrous aluminum chloride was charged to the flask and this mixture was stirred for 20 to 30 minutes after fuming ceased. A molten mixture of VTDA, 502 parts, was charged to the flask and mixed thoroughly at 80° C. The reaction solution was cooled to 50° C., charged to a one-gallon autoclave flushed with ethylene and pressurized to 400 psig ethylene. After rapid heating to 330° C. and addition of ethylene to a pressure above 1200 psig, the autoclave temperature was increased slowly until ethylene absorption began, around 345° C. to 360° C. When ethylene absorption stopped, the mixture was cooled, washed free of aluminum salts with caustic, and distilled. A product fraction containing 25 parts residual VTDA (5 mole percent), 70 parts EVTDA (2 major isomers, 11 mole percent), and 68 parts diethyl-VTDA (9 mole percent) was collected from a 2×45 cm helicespacked column at 130° C. to 155° C. and 5 mm Hg.

EXAMPLES 2-5

The experimental procedures for these examples were identical to those for Example 1 except for the catalyst preparation in Example 5. In this Example, diethyl aluminum chloride was added to aniline at room temperature and heated for 1.5 hours to 2 hours to a final temperature of 130° C. Heating was varied to maintain an ethane evolution rate of 1 liter to 1.5 liters per minute until reaction ceased. The ingredients and yields for Examples 1-5 are listed in Table I.

TABLE I

| Ex- ample | Aniline parts | Alum. parts | AlCl₃ parts | TDA Initial parts | TDA Final parts | Ethyl- VTDA | Diethyl- VTDA |
|---|---|---|---|---|---|---|---|
| 2 | 1900 | 47 | 117 | 461 | 21 | 38 | 14 |
| 3 | 1900 | 38 | 94 | 591 | 36 | 79 | 32 |
| 4 | 1900 | 47 | 117 | 513 | 73 | 84 | 21 |
| 5 | 1700 | 175* | — | 438 | 35 | 44 | 6 |

*Aluminum added as diethyl aluminum chloride.

EXAMPLES 6-9

In Examples 6-9, the EVTDA was tested as a chain extender for the preparation of polyurethane molded parts. The formulations were processed according to the reaction injection molding process (RIM) using high pressure metering devices in which materials are mixed by means of impingement mixing. The equipment used was an EMB Puromat 30. For a specific description of the RIM process, see L. J. Lee, "Polyurethane Reaction Injection Molding:Materials and Properties," *Rubber Chemistry and Technology*, vol. 53, pages 542 et seq (1980).

The specific ingredients employed and the amounts thereof, and the properties of the resulting molded part are presented in Tables II and III which follow. These examples illustrate that molded parts with desirable strength properties and improved elongation and tear properties can be prepared using the EVTDA as chain extenders.

TABLE II

| Example | 6 | 7 | 8 |
|---|---|---|---|
| Formulation, pbw | | | |
| Polyol A | 95 | 91.5 | 90 |
| Ethylated Vicinal Toluenediamine | 5 | 8.5 | 10 |
| T-12 | 0.1 | 0.1 | 0.1 |
| Isocyanate | 19.6 | 27.5 | 30.9 |
| Properties | | | |
| Density, pcf | 66.1 | 65.7 | 66.3 |
| Modulus, psi | | | |
| 100% | 202 | 363 | 453 |
| 300% | 390 | 677 | 740 |
| Maximum Instron elongation*, % | 637 | 610 | 670 |
| Maximum Instron tensile*, psi | 677 | 1085 | 1367 |
| Elongation, % | — | — | — |
| Split tear, pi | 57 | 118 | 168 |
| Graves tear, pi | 183 | 230 | 307 |
| Shore "A" hardness | 51/50 | 69/67 | 76/74 |
| Flexibility modulus × 10³ | | | |
| −20° F. | 1402 | 5581 | 10,131 |
| 72° F. | 761 | 2307 | 4018 |
| 158° F. | 622 | 1692 | 2464 |
| Ratio −20° F./158° F. | 2.25 | 3.29 | 4.11 |

*Limit of Instron. Test specimen not broken.
All pads postcured at 250° F. for 60 minutes. Index 105

Table III, which follows, provides data which resulted from a test using diethyl toluenediamine instead of EVTDA. A comparison of the data in Table II and Table III indicate that when the EVTDA is used as a chain extender, improved elongation values and split tear values are obtained.

TABLE III

| EVALUATION OF DIETHYL TOLUENEDIAMINE | | |
|---|---|---|
| Example | A | B |
| Formulation, pbw | | |
| Polyol A | 95 | 90 |
| Diethyl TDA | 5 | 10 |
| T-12 | 0.1 | 0.1 |
| Isocyanate | 19.1 | 29.5 |
| Properties | | |
| Density, pcf | 64.5 | 65.8 |
| Tensile, psi | 890 | 1947 |
| Modulus, psi | | |
| 100% | 300 | 753 |
| 300% | 737 | 1750 |
| Elongation, % | 350 | 343 |
| Split tear, pi | 38 | 83 |
| Graves tear, pi | 219 | 401 |
| Shore "A" hardness | 56/56 | 82/81 |
| Flexibility modulus × 10³ | | |
| −20° F. | 917 | 11,714 |
| 72° F. | 683 | 5427 |
| 158° F. | 606 | 4127 |
| Ratio −20° F./158° F. | 1.51 | 2.84 |

All pads postcured at 250° F. for 60 minutes. Index 105

The embodiments of the invention in which an exclusive privilege or property is claimed are defined as follows:

1. A process for preparing a polyurethane elastomer which comprises reacting
   (a) an organic polyisocyanate,
   (b) one or more compounds with an average molecular weight of 1000 to 8000 having two or more active hydrogen atoms as determined by the Zerewitinoff method, and
   (c) from 5 to 40 parts of a mixture of alkylated vicinal toluenediamines having the following structural formulae:

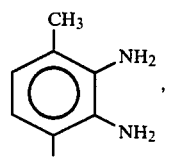

(a)

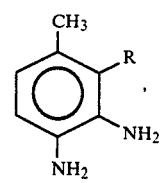

(b)

-continued

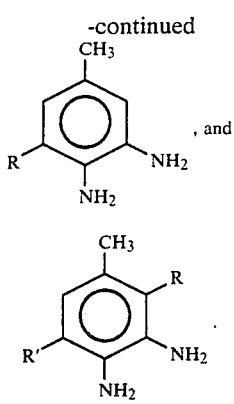

wherein R and R' independently represent a linear or nonlinear alkyl radical having 1 to 4 carbon atoms.

2. The process of claim 1 carried out by means of reaction injection molding techniques.

3. The process of claim 2 wherein the amount of reactants is such that 0.9 equivalent to 1.15 equivalents of isocyanate is present per equivalent of active hydrogen atom in (b) plus (c).

4. The process of claim 3 carried out in the presence of a catalyst.

5. The process of claim 4 carried out in the presence of a blowing agent.

6. The process of claim 5 wherein the polyol is selected from the group consisting of polyoxyalkylene polyether polyols and graft polyoxyalkylene polyether polyols.

7. The process of claim 6 wherein the organic polyisocyanate is selected from the group consisting of a urethane modified 4,4'-diphenylmethane diisocyanate, a carbodimide modified 4,4'-diphenylmethane diisocyanate, and mixtures of diphenylmethane diisocyanates and polymethylene polyphenyl polyisocyanates.

8. A molded polyurethane part prepared in accordance with claim 1.

9. A molded polyurethane part prepared in accordance with claims 2, 3, 4, 5, 6, or 7.

* * * * *